United States Patent [19]

Vossoughi et al.

[11] Patent Number: 4,836,486
[45] Date of Patent: Jun. 6, 1989

[54] ADJUSTABLE SUPPORT

[75] Inventors: Sohrab Vossoughi, Portland; Marvin G. Astleford, Hillsboro, both of Oreg.

[73] Assignee: Anthro Corporation, Portland, Oreg.

[21] Appl. No.: 184,909

[22] Filed: Apr. 21, 1988

Related U.S. Application Data

[63] Continuation-in-part of Ser. No. 39,183, Apr. 16, 1987, Pat. No. 4,783,036.

[51] Int. Cl.⁴ .............................................. E04G 3/00
[52] U.S. Cl. ................................. 248/281.1; 248/278; 248/280.1
[58] Field of Search ................. 248/281.1, 278, 280.1, 248/183, 122, 586, 349, 585, 289.1, 279

[56] References Cited

U.S. PATENT DOCUMENTS

| | | | |
|---|---|---|---|
| 256,583 | 4/1882 | Merrill | 248/281.1 |
| 3,000,606 | 9/1961 | Storm et al. | 248/585 X |
| 4,183,489 | 1/1980 | Copher | 248/122 X |
| 4,397,439 | 8/1983 | Wilbur | 248/281.1 X |
| 4,542,872 | 9/1985 | Marino | 248/183 |
| 4,547,027 | 10/1985 | Scheibenreif | 248/349 X |
| 4,562,987 | 1/1986 | Leeds | 248/278 |
| 4,589,621 | 5/1986 | Hunt | 248/586 |
| 4,591,122 | 5/1986 | Kreuzer | 248/280.1 |
| 4,657,217 | 4/1987 | Kiesel | 248/281.1 X |

FOREIGN PATENT DOCUMENTS 879336 10/1961 United Kingdom ............. 248/289.1

Primary Examiner—J. Franklin Foss
Attorney, Agent, or Firm—Dellett, Smith-Hill and Bedell

[57] ABSTRACT

An adjustable support allows a computer terminal or display device to be conveniently positioned above a desk. The support includes a platform for holding the terminal and a pivotally connected linkage assembly comprising proximal and distal arms for vertically and horizontally positioning the platform, the distal arm having the platform mounted thereon. The proximal arm comprises a set of members forming an articulated parallelogram structure, the proximal end of which is rotatable about a vertical post clamped to the desk. The vertical position of the terminal may be adjusted by changing the shape of the articulated parallelogram structure through operation of a lever coupling members of the articulated parallelogram. As the shape of the parallelogram structure changes, the elevation of the distal end of the proximal arm changes which in turn affects the vertical position of the platform and display device.

16 Claims, 5 Drawing Sheets

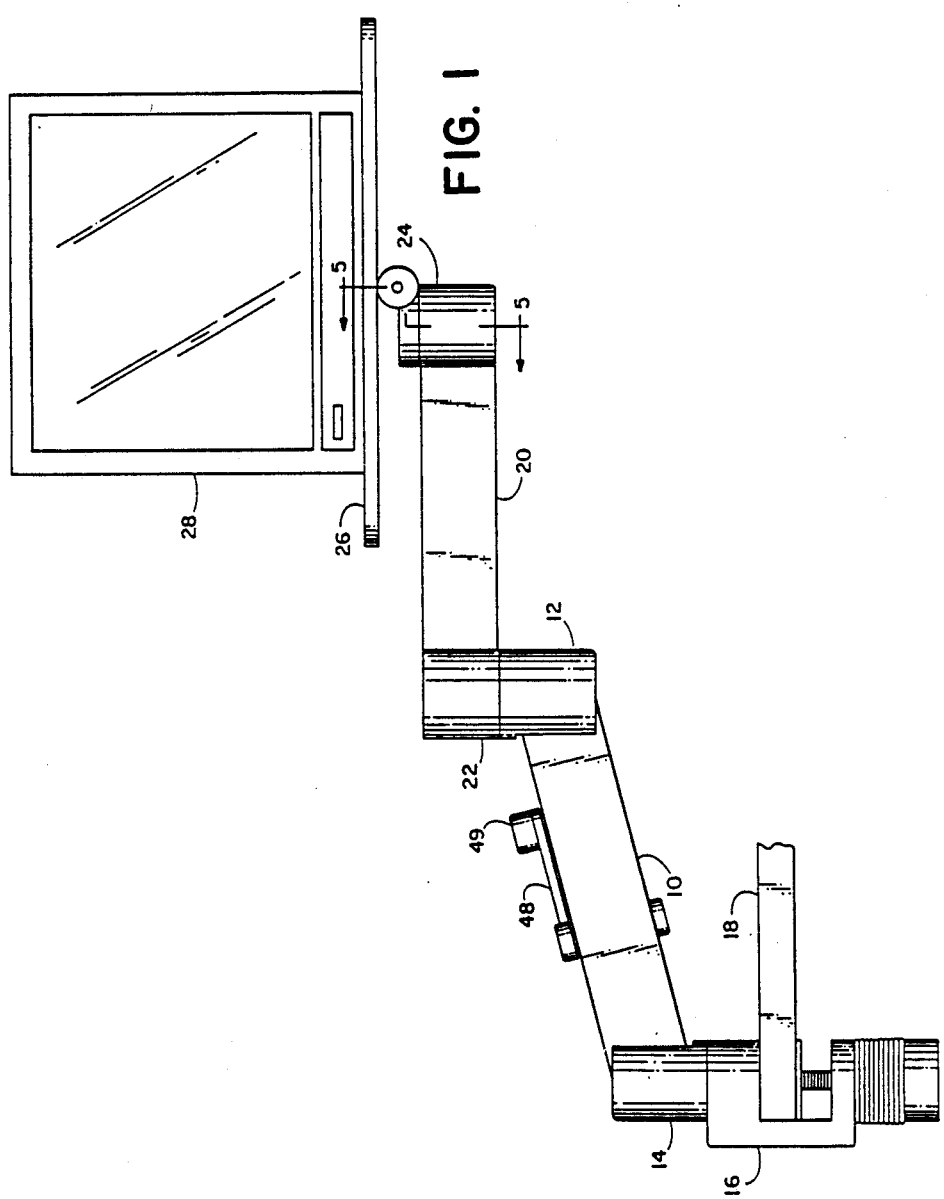

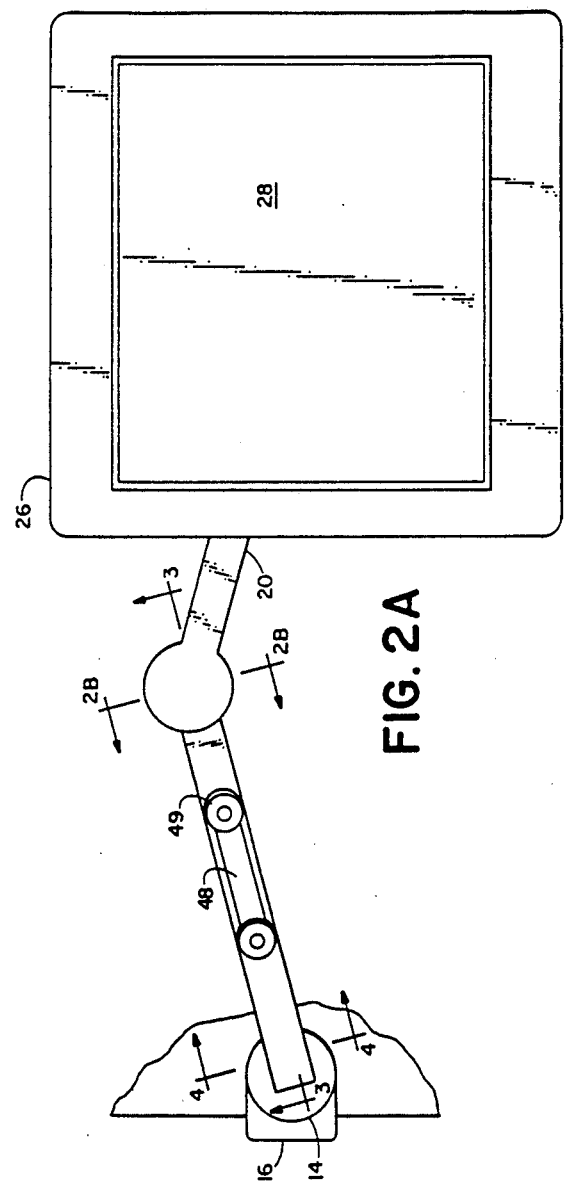

ADJUSTABLE SUPPORT

BACKGROUND OF THE INVENTION

This application is a continuation-in-part of U.S. patent application Ser. No. 07/039,183, file Apr. 16, 1987, entitled "Adjustable Support", now U.S. Pat. No. 4,783,036.

The present invention relates to an adjustable support and in particular to an adjustable support arm for a computer terminal or other equipment.

A computer terminal placed on a desk top may not be ideally positioned to suit the needs of every operator. An operator may find that the terminal is too high, too low, or too far from the edge of the desk for convenient operation, and may find that the terminal is tilted at an angle which makes it hard for the operator to easily view the terminal's screen. Thus it would be advantageous if an operator could easily adjust the elevation, horizontal position and tilt of the terminal. Also, since a computer terminal placed on a desk top takes up valuable workspace, it would be advantageous if a terminal positioned above a desk could be easily moved aside when not in use.

Various support apparatus have been developed to provide for flexible repositioning of a computer terminal. U.S. Pat. No. 4,589,621 entitled "Ergonomic Monitor Stand", issued to Hunt et al, May 20, 1986, describes a computer monitor stand comprising a platform for holding the monitor and a vertically extendable linkage for supporting the platform above a rotatable base. The Hunt et al stand allows the vertical position of the monitor to be adjusted, allows the monitor to be rotated about a vertical axis, and allows the monitor to be tilted about a horizontal axis. However, the stand does not permit the monitor to be moved horizontally.

U.S. Pat. No. 4,562,987, entitled "Computer Terminal Support with Five Degrees of Freedom", issued to Leeds et al, Jan. 7, 1986, discloses a terminal support for flexibly positioning a computer terminal above or to the side of a desk. The support, which allows the computer terminal to be moved in horizontal and vertical directions and to be rotated about vertical and horizontal axes, includes a platform for holding the computer terminal and a pair of horizontally disposed, pivotally linked, swivel arms for flexibly positioning the platform within a horizontal plane. A first collar attached to one end of one of the swivel arms slips over a king post clamped to the edge of a desk. A support collar mounted on the king post below the first collar includes a set bolt for fixing the vertical position of the first collar on the king post. To raise or lower the computer terminal, an operator must loosen the set bolt, raise or lower the support collar, support assembly and terminal, and then tighten the bolt. Inasmuch as the set bolt may be attached to the rear of the desk, it may be difficult for an operator to access it. In addition, while adjusting the vertical position of the monitor, the operator must support the full weight of the monitor and support assembly, which may be quite heavy. If the operator accidentally drops the assembly during the adjustment process, or if the operator does not adequately tighten the bolt, the support assembly will slip on the king post and strike objects on the desk below, and the resulting impact may damage the terminal.

U.S. Pat. No. 4,591,122 entitled "Support Structure with a Support Arm Pivotal for Height Adjustment", issued May 21, 1986, to Kreuzer, discloses a support structure having an arm comprising two parallelogram structures integral therewith. A compression spring forms one side of one of the parallelogram structures and is used to counter balance the weight of an apparatus being supported. A rod of variable length forms a portion of the other parallelogram structure. To fix the arm in a particular position, the rod length is adjusted so as to add to or relieve spring compression to stabilize the arm in a new position. Additional compression springs are required for the support of heavier apparatus. The use of compression springs and variable length rods to form the arm makes the support complex and costly.

SUMMARY OF THE INVENTION

A preferred embodiment of the present invention is an adjustable support for a computer terminal. The support allows the terminal to be conveniently positioned above a desk when in use, and then moved aside when not needed. The support includes a platform for holding the terminal, and proximal and distal arms for vertically and horizontally positioning the platform. The platform is mounted on a distal end of the distal arm. The proximal end of the distal arm is pivotally attached to the distal end of the proximal arm such that the distal arm is horizontally disposed and free to rotate in a horizontal plane about its proximal end. The proximal arm comprises a set of members forming a polygonal structure, preferrably an articulated parallelogram structure. As used in this specification, the term "polygonal structure" means a structure comprised of members of constant length rotatably attached in serial fashion to form a closed figure. In the preferred embodiment, the proximal end of the articulated parallelogram structure is pivotally attached to a clamp mounted on the desk such that the proximal arm may rotate about the clamp while maintaining the proximal and distal ends of the proximal arm vertically oriented.

The horizontal position of the terminal with respect to the desk top may be adjusted by rotating the proximal and/or distal arms about vertical axes passing through their proximal ends. The vertical position of the terminal may be adjusted by rotating the proximal arm about a horizontal axis passing through its proximal end so that its distal end rises or falls. As the elevation of the distal end of the proximal arm changes, the shape of the parallelogram structure changes such that the distal end of the proximal arm remains vertically oriented, thereby ensuring that the distal arm remains horizontally oriented.

The proximal arm comprises top, bottom, proximal and distal members connected to form an articulated parallelogram structure and a rigid sleeve surrounding and slideably engaging the parallelogram structure. A lever arm is pivotally attached to the top and bottom members such that when the lever arm is moved the shape of the parallelogram structure changes, thereby raising or lowering the distal end of the proximal arm. An operator moves the lever arm by turning a screw rotatably mounted on the sleeve and threadably engaging a block pivotally connected to a coupling point on a distal end of the lever arm. By turning the screw, the operator may conveniently adjust the vertical position of the computer terminal without having to manually support the weight of the assembly and the terminal while making the adjustment. Moreover, the screw and lever arm maintain the shape of the parallelogram against the weight of the terminal. The sleeve surrounding the parallelogram structure prevents the parallelogram structure from twisting.

It is therefore an object of the invention to provide an adjustable support for a terminal permitting the user to easily move the terminal horizontally and vertically.

The subject matter of the present invention is particularly pointed out and distinctly claimed in the concluding portion of this specification. However, both the organization and method of operation may best be understood by reference to the following description taken in connection with accompanying drawings wherein like reference characters refer to like elements.

DRAWINGS

FIG. 1 is a side view of an adjustable support;

FIG. 2A is a plan view of the adjustable support of FIG. 1;

DETAILED DESCRIPTION

Figure 2B:
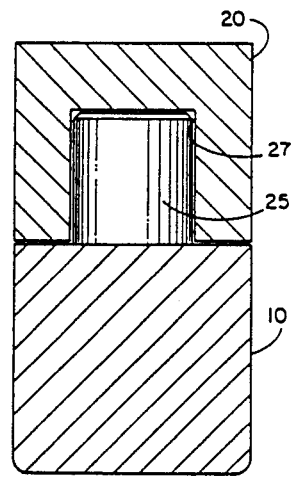
FIG. 2B is a sectional view of a bearing taken along lines 2B—2B of FIG. 2A.

With reference to FIGS. 1, 2A and 2B, an adjustable support for a computer terminal includes a proximal arm 10, having a distal end 12 and a proximal end 14 rotatably connected to a clamp 16 affixed to a work surface 18. A distal arm 20, having a proximal end 22 and a distal end 24, is rotatably connected at its proximal end 22 to the distal end 12 of proximal arm 10. A platform 26 for supporting a computer terminal 28 is rotatably connected to the distal end 24 of distal arm 20.

The rotatable connections at the proximal and distal ends of proximal arm 10 are similar in structure and may be understood by reference to FIG. 2B which shows the connection between arms 10 and 20 in section. A vertical bearing post 25 attached to the distal end 12 of arm 10 is disposed within a bearing cavity 27 formed in the proximal end 22 of arm 20 thereby allowing arm 20 to rotate about bearing post 25. A second vertical bearing post 29 (FIG. 3) is attached to the proximal end 14 of arm 10 and is received within a bearing cavity (not shown) in clamp 16 which allows arm 10 to rotate about the central axis o bearing post 29. The aforementioned rotatable connections between arm 10 and clamp 16 and between arm 10 and arm 20 allow platform 26 to be moved toward and away from clamp 16, thereby providing platform 26 with freedom of motion within a horizontal plane. A high degree of precision is required when dimensioning the bearing posts to fit within the bearing cavities.

Figure 4:
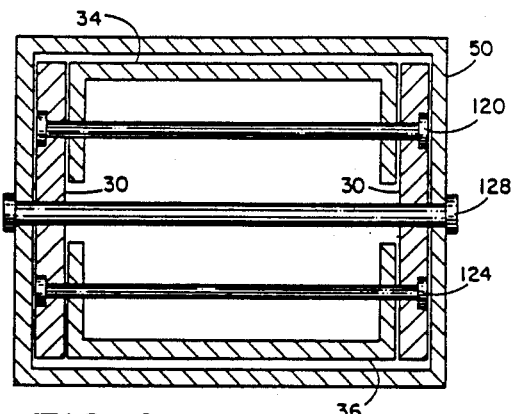
FIG. 4 is a another sectional view of the arm of FIG. 3 taken along lines 4—4 of FIG. 2A.
Figure 3:
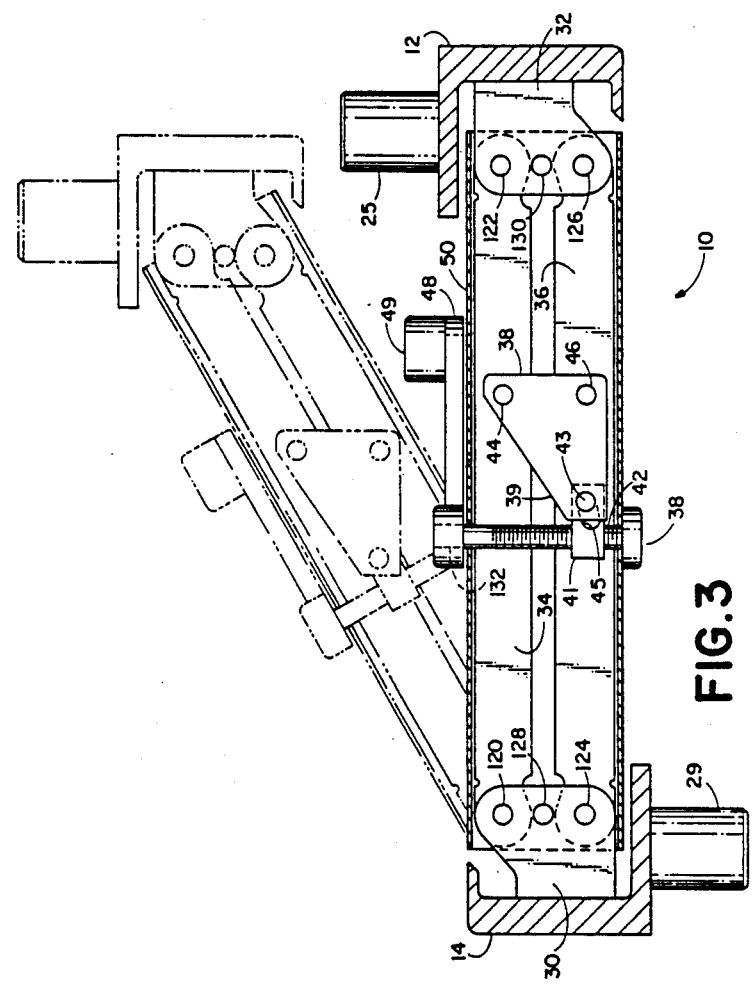
FIG. 3 is a sectional view taken along lines 3—3 of FIG. 2 which details an arm in the adjustable support of FIG. 1.

Vertical adjustment of platform 26 is provided by an articulated parallelogram structure integral to arm 10 used to cause distal end 12 of arm 10 to rise or fall in relation to proximal end 14 of arm 10. With reference to FIGS. 3-4, the articulated parallelogram structure comprises a proximal member 30, a distal member 32, a top member 34, and a bottom member 36. Proximal member 30 is attached with screws to the proximal end 14 of arm 10 and distal member 32 is attached with screws to the distal end 12 of arm 10. Ends of top member 34 and bottom member 36 are pinned to proximal member 30 and distal member 32 by rivets 120, 122, 124 and 126 so as to form an articulated parallelogram structure.

A sleeve 50, as best illustrated in FIGS. 3 and 4, prevents twisting of arm 10 about an axis colinear with arm 10. Proximal member 30 is pinned by a rivet 128 to sleeve 50 at a location that is equidistant from the point of connection to top member 34 and bottom member 36 while distal member 32 is similarly pinned to sleeve 50 by rivet 130. The cross-section of proximal and distal members 30 and 32, taken at the point of connection to sleeve 50, is generally rectangular and is closely received within the rectangular cross-section of sleeve 50. Distal member 32 (not shown in FIG. 4) having a similar cross-section at its point of connection to sleeve 50 is also closely received within sleeve 50. Sleeve 50 slidably engages proximal member 30 and distal member 32 so as to resist torsional forces applied to arm 10.

The vertical position of distal member 32 in relation to proximal member 30 is affected by changing the shape of the articulated parallelogram structure and the shape of the parallelogram structure is controlled by moving top member 34 in relation to bottom member 36. When top member 34 and bottom member 36 are vertically aligned, as shown in FIG. 3, distal member 32 is at the same height as proximal member 30. As top member 34 is moved to the right in relation to bottom member 36, distal member 32 rises in relation to proximal member 30. However, proximal member 30 and distal member 32 remain in substantially parallel relation independent of the shape of the parallelogram structure.

A lever arm 38 controls the relative position of top member 34 with respect to bottom member 36. A first pin 44 couples top member 34 to a first point of lever arm 38, while a second pin 46 couples bottom member 36 to a second point of lever arm 38 spaced apart from the first point. Lever arm 38 thereby acts as a constraint link for the parallelogram structure. Pin 44 is aligned in a common plane with rivets 120 and 122, and pin 46 is aligned in a common plane with rivets 124 and 126. A distal portion 39 of lever arm 38 extends in a plane perpendicular to pins 44 and 46. As lever arm distal portion 39 is moved or actuated, top member 34 moves in relation to bottom member 36 and thereby affects the shape of the parallelogram structure. Upward movement of portion 39 causes top member 34 to move to the right, thereby raising distal member 32. Subsequent downward movement of lever arm distal portion 39 causes top member 34 to move to the left, thereby lowering distal member 32.

Screw 42 is rotatably mounted through sleeve 50 and through slots in top and bottom members 34 and 36, Which slots allow members 34 and 36 to move along an axis transverse to screw 42 without contacting screw 42. A block 41 is pivotally connected by pin 43 to a coupling point in lever arm distal portion 39 and has a threaded central bore through which screw 42 passes so that rotation of screw 42 raises and lowers block 41 and actuates lever arm 38. Pin 43 resides within a slot 45 in block 41 to permit translational movement of block 41 with respect to lever arm 38, in addition to pivotal movement, caused by lateral movement of pin 43 with respect to screw 42 as lever arm 38 is moved.

Screw 42 has an upper end 132 including a handle 48 and knob 49 which allow an operator to turn screw 42. The operator changes the vertical position of terminal 22 simply by turning handle 48 with little effort. Adjustment of the vertical position of terminal 22 entails little risk of damage to equipment since screw 42 and lever arm 38 form a self-locking mechanism. While screw 42 can actuate lever arm 38 with great mechanical advantage, arm 38 cannot rotate screw 42. Thus, the shape of the parallelogram structure, and the height of platform 26, is maintained against collapse by the self-locking mechanism of screw 42 and lever arm 38.

Figure 6:
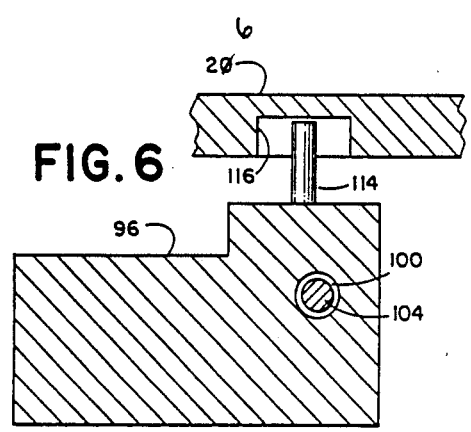
FIG. 6 is a sectional view taken along lines 6—6 of FIG. 5 also showing the platform utilized in the adjustable support arm of FIG. 1.
Figure 5:
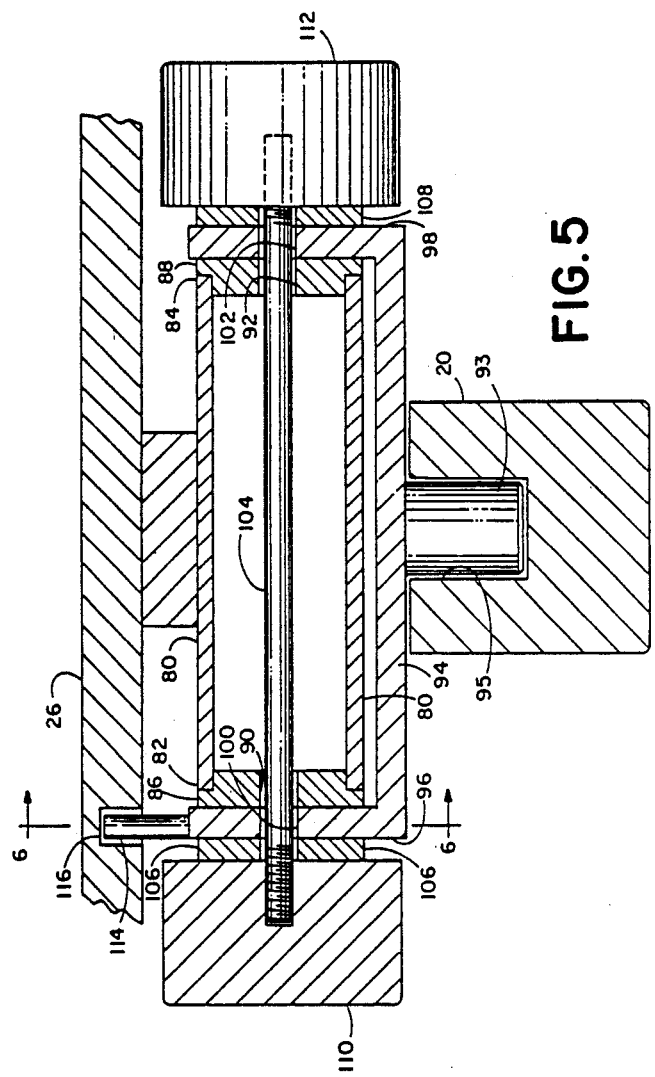
FIG. 5 is a sectional view taken along lines 5—5 of FIG. 1, showing the platform utilized in the adjustable support arm of FIG. 1.

In reference to FIGS. 5 and 6, platform 26 may be rotated about both vertical and horizontal axes. Rotation about the vertical axis allows platform 26 to orient the screen of terminal 28 in any horizontal direction independent of the motion of distal arm 20, while rotation about the horizontal axis allows platform 26 to tilt the screen of terminal 28 to a desired angle vertically. A sleeve 80, having a first end 82 and a second end 84, is affixed to the underside of platform 26 along the desired horizontal axis of rotation. A first bushing 86 is placed at the first end 82 of sleeve 80, and a second bushing 88 is similarly placed at the second end 84 of sleeve 80, bushing 86 having a central bore 90 and bushing 88 having a central bore 92. A vertical bearing post 93, disposed within a bearing cavity 95 formed in the distal end 24 of distal arm 20, provides the vertical axis of rotation. A channel-shaped bracket 94 is affixed to bearing post 93, bracket 94 having a first channel leg 96 and a second channel leg 98. Bracket 94 is dimensioned to allow an inner surface of channel leg 96 to abut bushing 86 and an inner surface of channel leg 98 to abut bushing 88 when sleeve 80 is located within the channel of bracket 94. Channel leg 96 has a bore 100 aligned with central bore 90 of bushing 86, and channel leg 98 has a bore 102 aligned with central bore 92 of bushing 88. A threaded rod 104, extending through the length of sleeve 80 within central bores 90 and 92 and within bores 100 and 102, is thereby centered within sleeve 80. A first washer 106 placed on threaded rod 104 abuts an outer surface of channel leg 96, while a second washer 108 placed at the opposite end of threaded rod 104 abuts an outer surface of channel leg 98. A knob 110 attached to one end of threaded rod 104 abuts washer 106, and a similar knob 112 attached to the other end of threaded rod 104 abuts washer 108.

Adjustment of knobs 110 and 112 on threaded rod 104 increases or decreases the friction between abutting elements in the assembly. When the friction is high, platform 26 is fixed in relation to bracket 94, but when the friction is decreased, platform 26 may be rotated about threaded rod 104. The amount of friction determines how much force is required to rotate platform 26 about threaded rod 104. At an appropriate level of adjustment of knobs 110 and 112, the friction is small enough to allow the user to tilt platform 26 yet great enough to maintain platform 26 in position without tightening the knobs.

To prevent excessive rotation of platform 26 about threaded rod 104, peg 114, connected to channel leg 96, extends into groove 116 formed in the underside of platform 26, groove 116 being aligned along a line perpendicular to threaded rod 104. As platform 26 is rotated in a first direction about threaded rod 104, peg 114 moves along the length of groove 116 and contacts a first end of groove 116, whereupon further rotation of platform 26 is inhibited. Similarly, as platform 26 is rotated in the opposite direction, peg 114 encounters the opposite end of groove 116, and further rotation in that direction is checked. In a preferred embodiment, peg 114 and groove 116 allow platform 26 to rotate within a 30 degree range, 15 degrees in either direction from a horizontal position.

Terminal 28 may be rotated and tilted without moving arm 10 or arm 20, allowing the screen of terminal 28 to be oriented in a variety of convenient directions. Vertical adjustment is accomplished by turning handle 48 in an appropriate direction to either raise or lower platform 26. Terminal 28 may be flexibly positioned to accommodate a particular user's posture or to allow several users to access terminal 28. Very little user effort is required to move terminal 28, and there is no risk of damage because the user does not have to lift the entire apparatus to change its vertical position.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An adjustable support comprising:
   a top member;
   a bottom member;
   a proximal member;
   a distal member;
   means coupling the top member, bottom member, proximal member, and distal member to form an articulated parallelogram structure;
   a constraint link having a first end, a second end and a distal portion, the first end being rotatably coupled to the top member and the second end being rotatably coupled to the bottom member, the distal portion including a coupling point; and
   means pivotally connected to said coupling point for moving said constraint link to affect the shape of the parallelogram.

2. An adjustable support according to claim 1 wherein said moving means comprises:
   a screw;
   a block threadably coupled to said screw; and
   means for pivotally coupling said block to said coupling point.

3. An adjustable support according to claim 2 wherein said block includes a slot and said coupling means comprises a pin engaging said coupling point and said slot.

4. An adjustable support according to claim 2 further comprising a sleeve surrounding said parallelogram structure to which sleeve said screw is rotatably mounted.

5. An adjustable support according to claim 4 wherein said sleeve slidably engages said parallelogram structure.

6. An adjustable support comprising:
   a first pivot mechanism defining a first axis of rotation;
   a second pivot mechanism defining a second axis of rotation parallel to the first axis of rotation; and
   a polygonal structure connecting the first pivot mechanism to the second pivot mechanism, wherein said polygonal structure comprises:
   a top member;

a bottom member;
a proximal member;
a distal member;
means coupling the top member, bottom member, proximal member, and distal member to form an articulated parallelogram structure;
a constraint link having a first end, a second end and a distal portion, the first end being rotatably coupled to the top member and the second end being rotatably coupled to the bottom member, the distal portion including a coupling point; and
means pivotally connected to said coupling point for moving said constraint link to affect the shape of the parallelogram.

7. An adjustable support according to claim 6 wherein said moving means comprises:
a screw;
a block threadably coupled to said screw; and
means for pivotally coupling said block to said coupling point.

8. An adjustable support according to claim 7 wherein said block includes a slot and said coupling means comprises a pin engaging said coupling point and said slot.

9. An adjustable support according to claim 7 further comprising a sleeve surrounding said parallelogram structure to which sleeve said screw is rotatably mounted.

10. An adjustable support according to claim 9 wherein said sleeve slidably engages said parallelogram structure.

11. An adjustable support comprising:
a first pivot mechanism defining a first axis of rotation;
a second pivot mechanism defining a second axis of rotation parallel to the first axis of rotation;
a rigid tubular sleeve having a first flat internal surface;
a polygonal structure including a portion having a first flat external surface closely received within said sleeve and slidably engaging said first flat internal surface of said sleeve, said polygon structure connecting the first pivot mechanism to the second pivot mechanism.

12. An adjustable support according to claim 11 wherein said polygonal structure comprises:
a top member;
a bottom member;
a proximal member;
a distal member; and
means coupling the top member, bottom member, proximal member, and distal member to form an articulated parallelogram structure.

13. An adjustable support according to claim 11 wherein said sleeve also has a second flat internal surface parallel to and spaced from said first flat external surface of said sleeve and wherein said portion of said polygonal structure also has a second flat external surface parallel to and spaced from said first flat external surface of said portion and slidably engaging said second flat external surface of said sleeve.

14. An adjustable support comprising:
a first pivot mechanism defining a first axis of rotation;
a second pivot mechanism defining a second axis of rotation parallel to the first axis of rotation;
a sleeve;
a top member;
a bottom member;
a proximal member;
a distal member;
means coupling the top member, bottom member, proximal member, and distal member to form an articulated parallelogram structure, a portion of said parallelogram structure being disposed within and slidably engaging said sleeve and connecting the first pivot mechanism to the second pivot mechanism;
a constraint link having a first end, a second end and a distal portion, the first end being rotatably coupled to the top member and the second end being rotatably coupled to the bottom member, the distal portion including a coupling point; and
means pivotally connected to said coupling point for moving said constraint link to affect the shape of the parallelogram.

15. An adjustable support according to claim 14 wherein said moving means comprises:
a screw rotatably connected to said sleeve;
a block threadably coupled to said screw; and
means pivotally coupling said block to said coupling point.

16. An adustable support according to claim 15 wherein said block includes a slot and said coupling means comprises a pin engaging said coupling point and said slot.

* * * * *

UNITED STATES PATENT AND TRADEMARK OFFICE
CERTIFICATE OF CORRECTION

PATENT NO. : 4,836,486

DATED : June 6, 1989

INVENTOR(S) : Sohrab Vossoughi and Marvin G. Astleford

It is certified that error appears in the above-identified patent and that said Letters Patent is hereby corrected as shown below:

Column 1, line 6, "file" should be --filed--.

Column 3, line 22, "2" should be --2A--.

Column 3, line 54, "o" should be --of--.

Column 4, line 58, "Which" should be --which--.

Signed and Sealed this

Twentieth Day of March, 1990

Attest:

JEFFREY M. SAMUELS

Attesting Officer

Acting Commissioner of Patents and Trademarks